United States Patent [19]
Gergely

[11] Patent Number: 5,561,732
[45] Date of Patent: Oct. 1, 1996

[54] DATA TRANSMISSION

[75] Inventor: Stephen Gergely, Coventry, United Kingdom

[73] Assignee: Coventry Univ. Enterprises & Welmed Ltd., Hampshire, United Kingdom

[21] Appl. No.: 204,327

[22] PCT Filed: Sep. 9, 1992

[86] PCT No.: PCT/GB92/01646

§ 371 Date: Sep. 28, 1994

§ 102(e) Date: Sep. 28, 1994

[87] PCT Pub. No.: WO93/05365

PCT Pub. Date: Mar. 18, 1993

[51] Int. Cl.$^6$ .................................................. G02B 6/00
[52] U.S. Cl. .................... 385/129; 250/227.18; 385/1; 385/901
[58] Field of Search ................ 385/12, 1, 4, 129, 385/141, 901; 250/227.11, 227.14, 227.18; 359/278, 326, 332

[56] References Cited

U.S. PATENT DOCUMENTS

| | | | |
|---|---|---|---|
| 4,650,992 | 3/1987 | Ruhrmann | 250/227 |
| 4,818,710 | 4/1989 | Sutherland et al. | 436/527 |
| 4,870,292 | 9/1989 | Alpert et al. | 250/577 |

FOREIGN PATENT DOCUMENTS

| | | | |
|---|---|---|---|
| 41773 | 9/1989 | Austria | G01J 1/58 |
| 0115025 | 8/1984 | European Pat. Off. | G01D 5/26 |
| 0361374 | 4/1990 | European Pat. Off. | G01D 5/26 |
| 3441498 | 5/1986 | Germany | G01D 5/30 |
| 3544290 | 6/1987 | Germany | G01B 11/02 |

*Primary Examiner*—John Ngo
*Attorney, Agent, or Firm*—Morse, Altman & Benson

[57] ABSTRACT

A device for data transmission by light has a waveguide doped with a fluorescent material. A light source is arranged to provide modulated light to enter the waveguide through an upper surface, the fluorescent material being responsive to the modulated light to emit light omnidirectionally. The emitted light is guided towards and emitted through end surfaces of the waveguide.

21 Claims, 4 Drawing Sheets

5,561,732

DATA TRANSMISSION

The present invention relates to data transmission by means of electromagnetic radiation and is applicable by way of example to position encoders.

Data transmission by means of electromagnetic radiation, e.g. light, is a useful technique in cases where data has to be transferred across a gap and/or between relatively movable parts. As a special case, a digital position encoder modulates the radiation with a code dependent upon the relative positions of two parts, one of which carries code elements which are able to modulate the radiation, e.g. by reflection or transmissivity.

According to a first aspect of the invention there is provided a device for data transmission by electromagnetic radiation comprising a member constituting a waveguide, means for providing pulsed or modulated radiation comprising a first frequency to enter the waveguide and means for detecting radiation at a second frequency at an end surface of the waveguide, the member having within it fluorescent material responsive to radiation at the first frequency to emit radiation at the second frequency, the emitted radiation being guided by the waveguide to the end surface.

According to a second aspect of the invention there is provided a position detector for detecting the relative positions of two parts comprising a data transmission device according to the above first aspect.

In one embodiment the means for providing modulated radiation comprises a plurality of portions relatively opaque to radiation at the first frequency and disposed between the waveguide and the source of radiation so that the radiation will be modulated by the pattern of said portions.

According to a third aspect of the invention there is provided an infusion pump transmission comprising a position detector according to the above second aspect, one of said parts being means for operating a syringe infusion pump plunger and the second being means arranged to be connected to the syringe infusion pump body.

According to a fourth aspect of the invention, there is provided a device for data transmission by electromagnetic radiation comprising a waveguide for the radiation, the waveguide having two, opposed, major surfaces, one of which provides an input for the radiation to the waveguide, an end or edge surface of the waveguide providing for output of radiation, there being source means of radiation for supplying radiation to said one major surface, detector means responsive to the directed radiation emitted from said end or edge surface, and means in the waveguide and responsive to input radiation for directing radiation towards the end or edge surface, that radiation being guided between the major surfaces.

In one example, the waveguide may be of a type containing fluorescent material having a maximum of absorption in the region of the frequency of the input radiation and a maximum of emission at a frequency to which the detector means is responsive.

There may be a plurality of elements relatively opaque to said pulsed radiation between the source and the waveguide, said elements being arranged according to an n-bit digital position code. The source means may comprise n individual sources for illuminating the respective bits in sequence, the device being arranged so that a single detector can be used to receive a series of bits defining the relative position of the source means and the code.

A waveguide doped or loaded with fluorescent material is readily obtainable at low cost. By virtue of its ability to emit light at a specific frequency when subjected to light at another, it proves to have a relatively good output light intensity compared with the incident intensity, i.e. good transfer properties.

For a better understanding of the invention and to show how the same may be carried into effect, reference will now be made, by way of example, to the accompanying drawings, in which.

Figure 1:
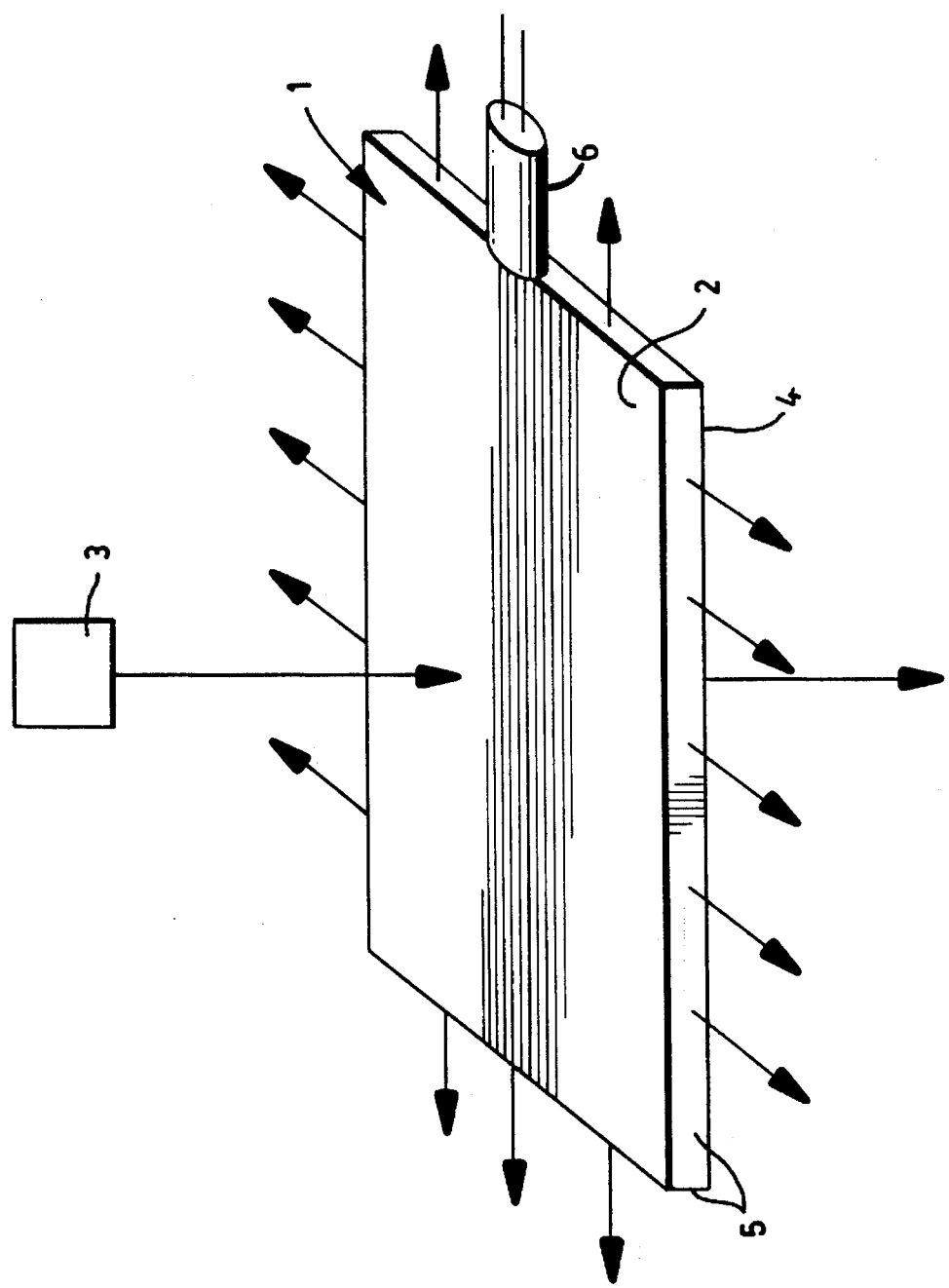
FIG. 1 illustrates a data transmission device having a waveguide.

FIG. 1 shows a data transmission device comprising a light waveguide structure 1 with light incident on its upper surface 2, the light being generated by a pulsed source 3. According to the material properties of the waveguide, some of the light will be reflected from the surface, some will be transmitted through the waveguide, exiting through the lower surface 4, and the remainder will be either absorbed by the material or will be scattered within the material and be guided thereby to exit through the four side edges 5. If the material is relatively transparent, the majority of light will pass straight through the material. If, however, the material is opaque, most of the light will be absorbed. In either case, very little of the light will be emitted through the edges.

Consider, however, a waveguide constructed using a relatively transparent material such as glass or plastics, which is doped with a fluorescent dye or compound. An example of such a material is a plastics sheet manufactured by Bayer AG under the trade name LISA, being polycarbonate doped with flourescent material. This exhibits a peak absorption at an approximate wavelength of 521 nm and a corresponding peak fluorescent emission at approximately 595 nm.

If light of a wavelength at or near the peak absorption wavelength is incident on the upper surface 2, a high proportion of it will be absorbed, with the subsequent emission of light at or near 595 nm. This light is emitted omni-directionally and a major portion of it will hit the upper and lower surfaces at an angle greater than the critical angle thus being confined between these surfaces. Thus light will be guided out towards the side edges 5 and will be emitted therefrom. A photodetector 6 having a peak response at approximately 595 nm, and being positioned at one of the edges, will respond to the emitted light by producing corresponding electrical signals. It will be clear that by using such a device, a modulated light signal impinging on the upper surface 2 can be converted into an electrical signal at the output of the photodetector 6. This is accomplished even if there is a gap between source 3 and waveguide 1 and or if there is relative motion between the two. It will be apparent that for a given fluorescent emission produced within the waveguide the intensity of light emitted can be increased by decreasing the surface area of the edges through which light is emitted.

Figure 2:
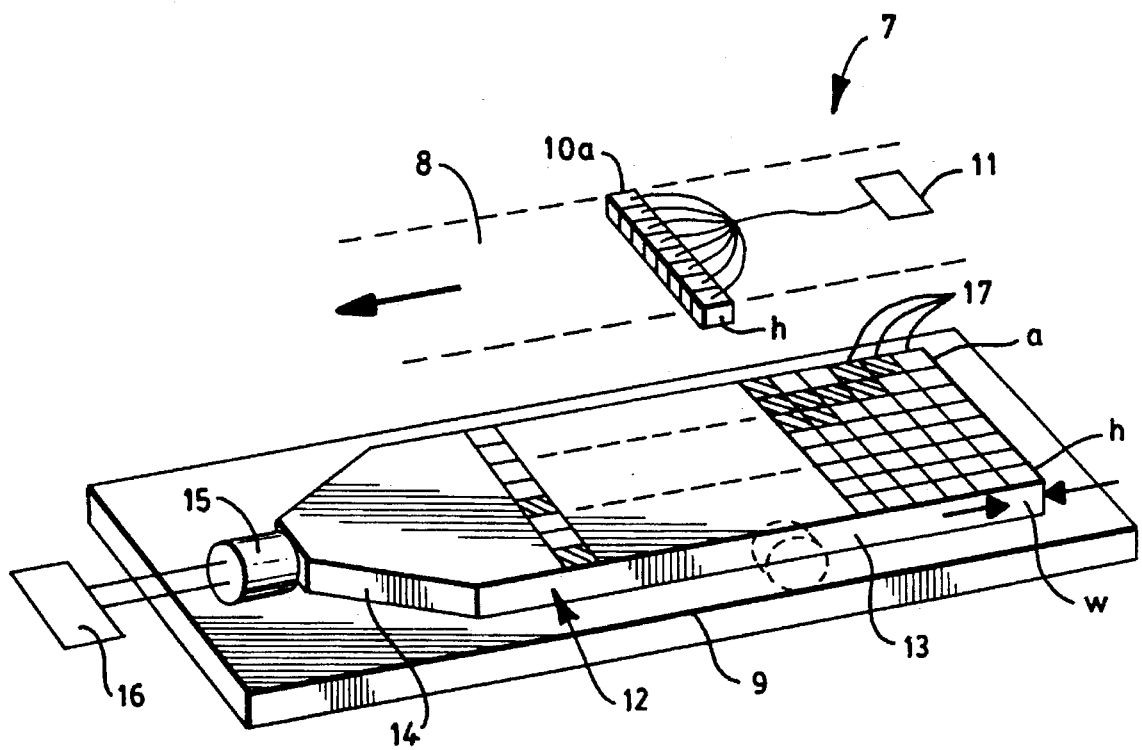
FIG. 2 illustrates a linear position detector.

FIG. 2 shows one possible application of the device, illustrating a position encoder 7 for determining the absolute position of a body 8 with respect to a fixed stage 9. Attached to a lower surface of the body is a row of 8 light emitting devices 10a to h, in this case these being light emitting diodes (LEDs), arranged so as to emit light in a generally downward direction. The LEDs are connected to electronic driving circuit 11, which may be either mounted on the body, on the stage, or elsewhere. The driving circuit is designed to allow the LEDs to be illuminated in a controlled sequential manner and to control the amount of drive current used. The voltage across and/or the current through the LEDs may be monitored by a microprocessor of the pump in order to detect their malfunction. Affixed to the stage 9 is a detector 12 comprising a waveguide 13 constructed using the fluorescently doped material described above, and which is generally rectangular in shape though tapering inwardly at one end to form a narrow throat 14. Abutted against the throat is a photodetector 15 which may be a photo diode or similar such device, and which is connected to a suitable electronic detection circuit 16 for detecting the electrical output from the photodetector. The detector may be a detector sensitive to red or infrared and proves to have adequate sensitivity at 595 nm. A detector with a peak sensitivity nearer to 595 nm could, of course, be used in preference.

Printed on the upper surface of the waveguide 13 are a series of 8 bit code sequences 17 arranged sequentially along the length of the waveguide. The width W of the sequences is equal to or greater than the width of the LEDs attached to the body 8. Each code sequence consists of a series 17a to h of eight interspersed optically transparent/optically opaque segments or bits arranged in a linear row across the width of the guide. The encode is shielded from ambient light.

The operation of the linear position encoder 7 will now be described. The body 8 is located directly above and parallel to the stage 9, so that the LED array lies fractionally above the surface of the waveguide, the LEDs lying over respective bits of one code sequence. If the body 8 is designed to move from right to left as seen in FIG. 2, the array would be arranged such that, at the rightmost position of the body, the array would lie directly above the rightmost code sequence on the upper surface of the waveguide.

The LEDs are chosen to have a peak emission wavelength at or near the peak excitation wavelength (521 nm) of the fluorescent material of the waveguide.

The driving circuit 11 is operated so as to illuminate LED 10a for a given time. This LED is then turned off and LED 10b is illuminated for the same time period. Similarly LEDs 10c to h are illuminated in turn, with the cycle repeating over regular intervals.

A proportion of the light emitted by each LED is coupled into the guide through its upper surface if the illuminated diode lies over a transparent bit of the code. If, however, the LED lies over an opaque bit, no significant amount of light will enter the guide. Light entering the guide will tend to excite the fluorescent material, resulting in emission at or near 595 nm.

As described above, the majority of the emitted light will travel through the waveguide exiting through the side edges. Some of the light will exit through the throat 14 where it will enter the photodetector 15. This will result in an electrical pulse being generated by the photodetector 15 of duration corresponding to the duration of the emitted light. As each of the LEDs is illuminated, a series of pulses will result corresponding to the code sequence directly below the LED array.

Figure 3:
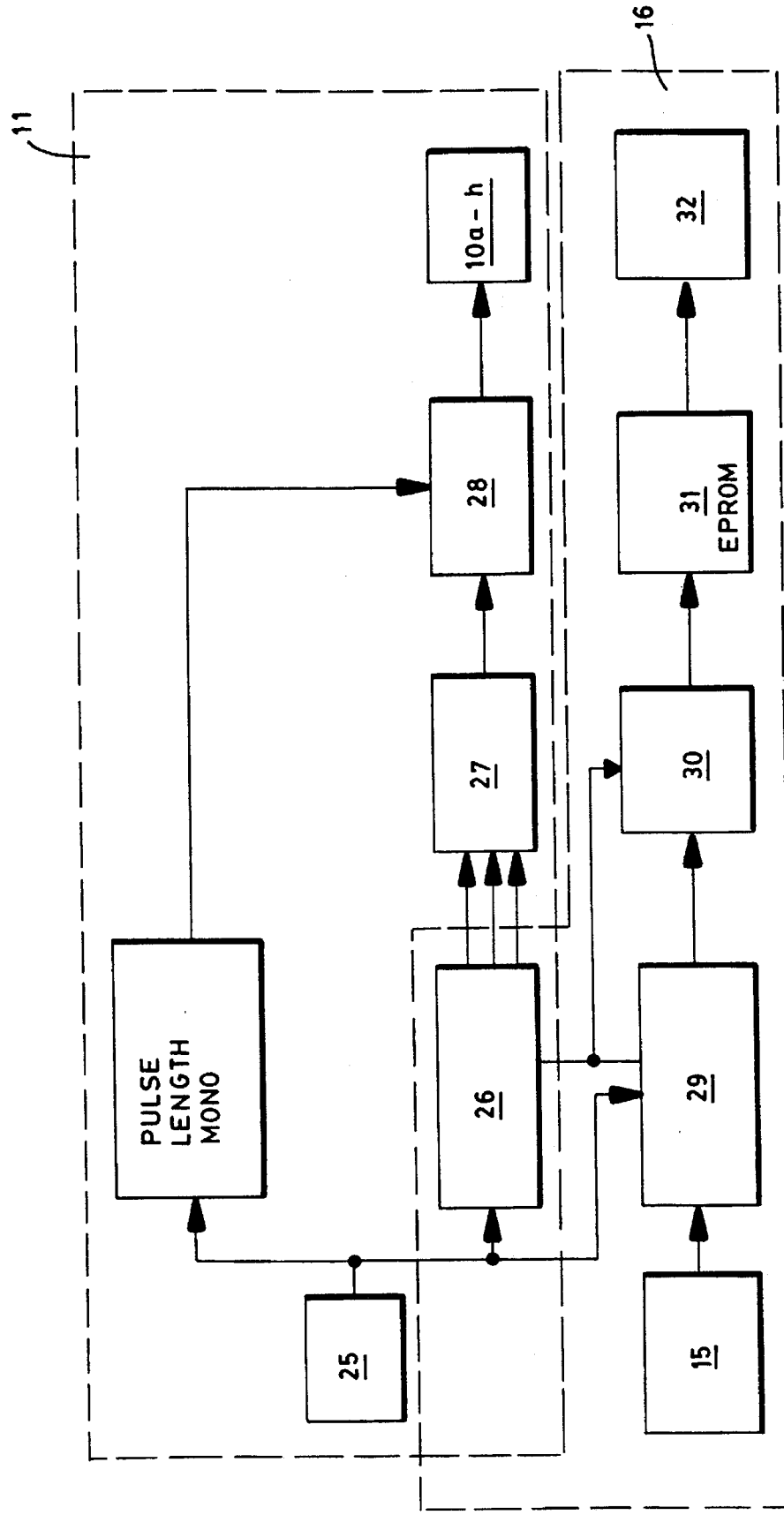
FIG. 3 illustrates the drive and detector circuits for the detector of FIG. 2.

FIG. 3 illustrates one possible configuration of the detection circuit 16 and the drive circuit 11. The latter has a counter 26 which is clocked by clock 25 to count from 0 to 7, reset, and repeat, the output being a three bit binary word. This word is decoded by a 3-to-8 line decoder 27 which addresses LED driver 28 and which in turn drives the selected LED.

The detection circuit 16 has a serial to parallel converter 29 connected to receive the pulses generated by the photodetector 15. The output from converter 29 is an 8 bit word which is stored by a latch 30. Both the converter and the latch are synchronised by the clock 25 to capture the 8 bits present between illumination of first LED 10a and the turning off of last LED 10h. An output of the counter 26, produced every 8 counts, controls the converter and the latch to inform them of the start and finish of each 8 bit word. Once a word has been received and stored in the latch, a decoder 31 is used to convert the code into a position value, e.g. as a binary number, which is a measure of the absolute position of the body with respect to the stage and which can then be displayed on a display output 32.

It is to be noted that many of the functions of the above circuit may be carried out by the microprocessor and memory used to control other functions of the pump.

The resolution of this system is determined by the width W of the code sequences. In the preferred embodiment W is 0.5 mm with the total length of the coded upper surface being 10 centimeters, i.e. 200 code sequences. If a unique code is required for each position, then eight bit code sequences and eight LEDs are required.

Code sequences could be selected in many ways. However, many arrangements may give erroneous results when the array is positioned midway between two neighbouring sequences. This problem is overcome by using a code such as a Gray code, where only one bit of the code changes between neighbouring sequences.

Figure 4:
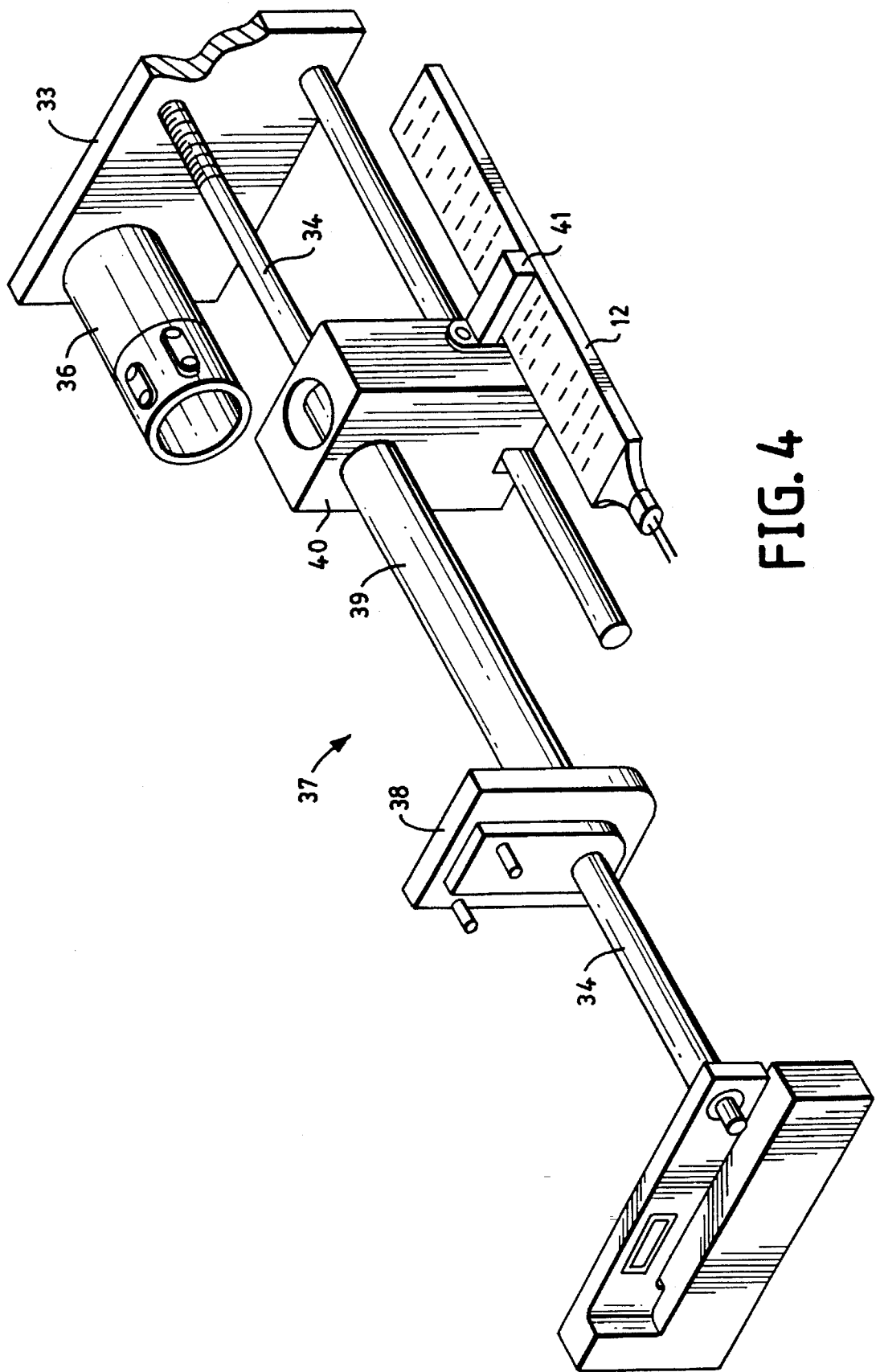
FIG. 4 is a perspective view of a syringe infusion pump transmission incorporating a position detector according to FIGS. 2 and 3.

FIG. 4 illustrates the use of a position encoder in a syringe infusion pump transmission. Such a transmission is disclosed in U.K. Patent No. 2 224 444. The transmission comprises a fixed plate 33 in which is rotatably mounted a leadscrew 34. The leadscrew can be moved axially through the fixed plate 33, by means of a motor 36 and associated gears, to drive a carriage mechanism 37. The carriage mechanism comprises a drive plate 38, a sleeve 39 and a body 40 connected in sequence. The drive plate 38 is arranged to drive the plunger of a syringe infusion pump, not shown, whose body portion is fixed relative to the fixed plate 33. The body 40 has an arm 41, on the lower surface of which are mounted the LEDs 10a to h. Beneath the arm and spaced apart from the LEDs is the detector 12 which is fixed relative to the syringe body and fixed plate.

The motor 36 may have its own high resolution encoder 42 but the encoder described with reference to FIG. 2 provides an absolute measurement on the plunger itself. Its resolution may be relatively low but, nevertheless, it provides data of sufficient accuracy to enable the data from the motor encoder to be checked and corrected if necessary, thus giving more reliable information.

In an alternative embodiment of a position encoder according to the present invention, the source array, the waveguide and the detector are stationary and the code sequences are attached to the plunger which moves the code sequences between the array and waveguide.

A further embodiment has the detector 15 positioned centrally as shown dotted in FIG. 2 in order to minimise light travel paths. Moreover the surfaces of the waveguide may be angled so as to improve the guiding of the light to the detector 15.

Figure 5:
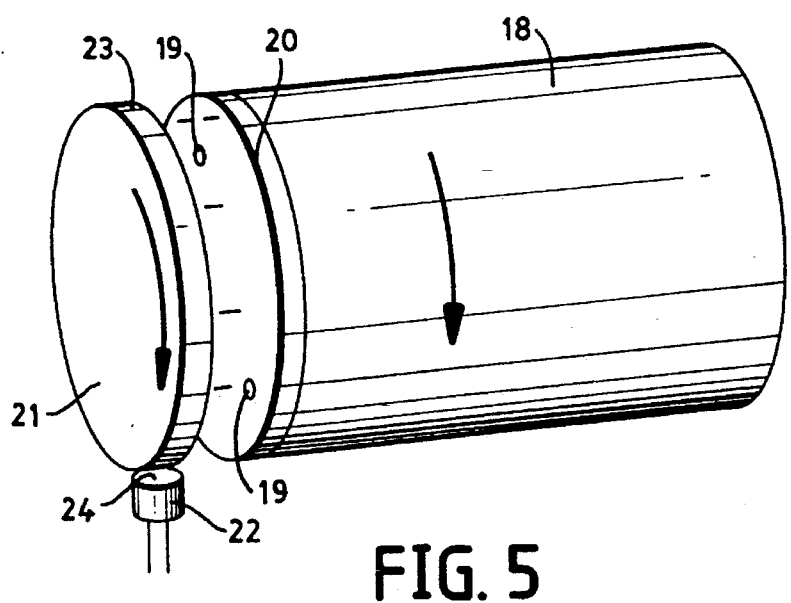
FIG. 5 illustrates a rotary data transmitter.

FIG. 5 shows a second embodiment of a position encoder according to the present invention. A rotating shaft or device 18 has one or more, e.g. three, LEDs 19 in a disk positioned on one end surface 20. The or each LED is driven by electronic pulse drive means located within the device (not shown). A disk 21 constructed using the fluorescently doped plastics material described above is attached to the LED disk 20 to rotate with the device 18. A photodiode 22 or similar photodetector is located adjacent the disk periphery 23 with only a small gap between its light input surface 24 and the periphery 23 of the disk.

The LED drive means transmits pulses to the or each LED, which pulses are output as a series of light pulses. As described above, the output wavelength of the LED light is selected to be at or near the fluorescent excitation peak of the fluorescent material, resulting in the emission of light within the disk 21 at the emission peak of the material.

This light will travel radially outwards towards the periphery 23, from where it will be uniformly radiated. Detector 22 will receive the light and generate corresponding pulsed electrical signals.

It is clear that, no matter what the relative angular position of the device 18 and the disk 21, signals can be transmitted between the device and the detector.

Whilst this embodiment includes only one LED disk 20 and one detector disk 21, a plurality of such pairs of disks could be positioned on the device 18, each having a separate detector 22 and light source 19, allowing simultaneous transmission of several signals.

Moreover, the or each disk 23 might alternatively be stationary rather than rotate with the device 18. In another alternative, the disk 21 might rotate whilst the device 18 is fixed.

This data transmission principle is equally useful for applications involving a limited range of linear motion.

Such a device can also be designed as a rotary encoder. The LED disk may have a radial series of LEDs to rotate with device 18, whilst the disk 21 might be fixed and have a plurality of radially extending Gray code sequences.

In order to increase the signal to noise ratios of any one of the above described embodiments, unused surfaces i.e. those not directly receiving light from the input source and those not directly emitting light to the detector, may be mirror coated to retain within the waveguide light radiation which would otherwise be emitted therefrom.

I claim:

1. A device for data transmission by electromagnetic radiation, between relatively movable first and second parts, of a plurality of digital bit values forming a digital multi-bit word, the device comprising:

a member constituting a waveguide for electromagnetic radiation and having a radiation input surface and an end output surface;

a plurality of sequentially operable means for providing respective pulsed beams of radiation comprising a first frequency to enter the waveguide at the radiation input surface;

means for receiving radiation at a second frequency at the end output surface of the waveguide;

the member having within it fluorescent material responsive to radiation at the first frequency to emit at the second frequency radiation guided by the waveguide to the end output surface; and means for modulating the beams according to the respective bit values of the multi-bit word;

whereby the radiation at the second frequency at the end output surface constitutes a serial digital stream of the respective bit values.

2. A device as claimed in claim 1 wherein the fluorescent material has a maximum of absorption in the region of the first frequency.

3. A device as claimed in claim 2 wherein the frequency of maximum absorption is 521 nm.

4. A device as claimed in claim 2 wherein the fluorescent material has a maximum of emission at the second frequency.

5. A device as claimed in claim 4 wherein the frequency of maximum emission is 595 nm.

6. A device as claimed in claim 1 wherein the waveguide is a planar waveguide having two opposed major surfaces which act as guide surfaces for the emitted radiation.

7. A device as claimed in claim 6 wherein the means for providing radiation is arranged to provide it through one of the major surfaces.

8. A device as claimed in claim 1 wherein said end surface is substantially perpendicular to a guide axis of the waveguide.

9. A device as claimed in claim 1, wherein the waveguide has at least one surface coated with a reflective coating wherein light confinement within the waveguide is improved.

10. A device as claimed in claim 1 wherein the said end surface of the waveguide is at a narrow end of a throat portion formed by at least one tapering sidewall of the waveguide, wherein light defined from any one of the providing means may be guided to the same portion of that narrow end.

11. A device as claimed in claim 1 wherein the means for receiving radiation comprises a single detector.

12. A position detector for detecting relative position and comprising two parts which are relatively movable in a direction of relative motion and means for detecting the relative position of said parts comprising:

a member constituting a waveguide for electromagnetic radiation and having a radiation input surface and an end output surface;

a plurality of sequentially operable means attached to a first of the two parts for providing respective pulsed beams of radiation comprising a first frequency to enter the waveguide at the radiation input surface as a sequence of beams extending at an angle to the direction of relative motion of the two parts;

means for receiving radiation at a second frequency at the end output surface of the waveguide;

the member having within it fluorescent material responsive to radiation at the first frequency to emit at the second frequency radiation guided by the waveguide to the end output surface;

means interposed between the member and the means for providing radiation for modulating the beams;

the modulating means having a plurality of beam modulating strips which follow one another in a sequence which extends in the direction of relative motion of the two parts, the strips defining respective and distinct multi-bit words in that each strip is effective to modulate the beams according to respective bit values of the associated multi-bit words; and means attaching the modulating means to a second of the two parts so as to interpose a different strip between the member and the means for providing radiation according to the relative position of the member and the means for providing radiation;

whereby the radiation at the second frequency at the end output surface constitutes a serial digital stream of the respective bit values of a digital word defining an absolute position.

13. A position detector as claimed in claim 12 wherein said modulating means comprises a plurality of elements relatively opaque to radiation at the first frequency positioned between the means for providing radiation and the waveguide, the elements being arranged in an n-bit code.

14. A position detector as claimed in claim 13, comprising n of said selectively operable means for illuminating respective bits in the code.

15. A position detector as claimed in claim 14 comprising a plurality of the said n-bit codes arranged sequentially in the direction of relative motion of the two parts.

16. A position detector as claimed in claim 15 wherein the plurality of n-bit codes are arranged sequentially as a Gray code.

17. A position detector as claimed in claim 13 wherein the elements forming the codes are on a surface of the waveguide and the detecting means are arranged to be fixed relative to the first of the parts and the plurality of means for providing radiation are arranged to be fixed relative to the second of the parts.

18. A position detector as claimed in claim 13 wherein the waveguide, detecting means and plurality of means for providing radiation are arranged to be fixed relative to said first of the parts and the elements forming the codes are arranged to be fixed relative to the second of the parts.

19. A position detector as claimed in claim 12 wherein the parts are arranged for relative linear motion.

20. A position detector as claimed in claim 12 wherein the parts are arranged for relative rotary motion.

21. A syringe infusion pump transmission comprising a first part, being means for operating a syringe infusion pump plunger, a second part, being means arranged to be connected to a syringe pump body with the parts being relative movable, and a position detector comprising:

a member constituting a waveguide and having an end surface;

a plurality of sequentially operable means attached to the first part for providing respective pulsed beams of radiation comprising a first frequency to enter the waveguide as a sequence of beams extending substantially at right angles to the direction of relative motion of the parts;

means for receiving radiation at a second frequency at the end surface of the waveguide;

the member having within it fluorescent material responsive to radiation at the first frequency to emit at the second frequency radiation guided by the waveguide to the end surface;

means interposed between the member and the means for providing radiation for modulating the beams;

the modulating means having a plurality of beam modulating strips which follow one another in a sequence which extends in the direction of relative motion of the two parts, the strips defining respective and distinct multi-bit words in that each strip is effective to modulate the beams according to respective bit values of the associated multi-bit words; and means attaching the modulating means to the second part so as to interpose a different strip between the member and the means for providing radiation according to the relative position of the member and the means for providing radiation;

whereby the radiation at the second frequency at the end output surface constitutes a serial digital stream of the respective bit values of a digital word defining an absolute position.

* * * * *